(12) United States Patent
Lee et al.

(10) Patent No.: US 10,069,132 B2
(45) Date of Patent: Sep. 4, 2018

(54) METHOD OF COATING SUBSTRATE FOR LITHIUM SECONDARY BATTERY WITH INORGANIC PARTICLES AND LITHIUM SECONDARY BATTERY COMPRISING SUBSTRATE COATED BY THE METHOD

(71) Applicant: LG Chem, Ltd., Seoul (KR)

(72) Inventors: Joo-Sung Lee, Daejeon (KR);
Jong-Hun Kim, Daejeon (KR);
Jeong-Min Ha, Daejeon (KR);
Bo-Kyung Ryu, Daejeon (KR);
Jin-Woo Kim, Daejeon (KR)

(73) Assignee: LG Chem, Ltd. (KR)

(*) Notice: Subject to any disclaimer, the term of this patent is extended or adjusted under 35 U.S.C. 154(b) by 353 days.

(21) Appl. No.: 14/299,124

(22) Filed: Jun. 9, 2014

(65) Prior Publication Data
US 2014/0287327 A1    Sep. 25, 2014

Related U.S. Application Data

(63) Continuation of application No. PCT/KR2013/001536, filed on Feb. 26, 2013.

(30) Foreign Application Priority Data

Mar. 5, 2012   (KR) .................. 10-2012-0022404
Feb. 25, 2013  (KR) .................. 10-2013-0019902

(51) Int. Cl.
*H01M 6/16* (2006.01)
*H01M 4/04* (2006.01)
(Continued)

(52) U.S. Cl.
CPC ....... *H01M 4/0402* (2013.01); *H01M 4/0404* (2013.01); *H01M 4/0414* (2013.01);
(Continued)

(58) Field of Classification Search
CPC .. H01M 4/0402; H01M 4/0404; H01M 4/131; H01M 4/133; H01M 4/134;
(Continued)

(56) References Cited

U.S. PATENT DOCUMENTS

2004/0106040 A1*  6/2004  Fukuoka ............. H01M 4/0428
                                              429/212
2006/0153972 A1*  7/2006  Hirokawa ............ H01G 9/058
                                              427/79

(Continued)

FOREIGN PATENT DOCUMENTS

JP    2001351616 A    12/2001
JP    2011077014 A     4/2011
(Continued)

OTHER PUBLICATIONS

International Search Report for Application No. PCT/KR2013/001536 dated Jun. 14, 2013.
(Continued)

*Primary Examiner* — Jimmy Vo
(74) *Attorney, Agent, or Firm* — Lerner, David, Littenberg, Krumholz & Mentlik, LLP (57) ABSTRACT

The present invention provides a method of coating a substrate for a lithium secondary battery with inorganic particles, comprising charging the inorganic particles to form charged inorganic particles; transferring the charged inorganic particles on the substrate for a lithium secondary battery to form a coating layer; and fixing the coating layer with heat and pressure. Such a coating method according to one embodiment of the present invention uses electrostatic force without the addition of a solvent, and therefore, non use of a solvent can result in cost-reducing effects since there is no burden on the handling and storing of the solvent, and since a drying procedure after slurry coating is not needed, (Continued)

it allows for the preparation of a lithium secondary battery in a highly effective and rapid manner.

15 Claims, 3 Drawing Sheets (51) Int. Cl.
    *H01M 10/052*     (2010.01)
    *H01M 4/131*      (2010.01)
    *H01M 4/133*      (2010.01)
    *H01M 4/134*      (2010.01)
    *H01M 4/1391*     (2010.01)
    *H01M 4/1393*     (2010.01)
    *H01M 4/1395*     (2010.01)
    *H01M 4/38*       (2006.01)
    *H01M 4/587*      (2010.01)
    *H01M 10/0525*    (2010.01)
    *H01M 4/139*      (2010.01)

(52) U.S. Cl.
    CPC ......... *H01M 4/0471* (2013.01); *H01M 4/131* (2013.01); *H01M 4/133* (2013.01); *H01M 4/134* (2013.01); *H01M 4/139* (2013.01); *H01M 4/1391* (2013.01); *H01M 4/1393* (2013.01); *H01M 4/1395* (2013.01); *H01M 4/38* (2013.01); *H01M 4/382* (2013.01); *H01M 4/587* (2013.01); *H01M 10/052* (2013.01); *H01M 10/0525* (2013.01); *H01M 4/043* (2013.01)

(58) Field of Classification Search
    CPC ............ H01M 4/1391; H01M 4/1393; H01M 4/1395; H01M 4/38; H01M 4/382; H01M 4/587; H01M 4/043; H01M 4/0471; H01M 10/052; H01M 10/0525
    See application file for complete search history.

(56) References Cited

U.S. PATENT DOCUMENTS

| | | | |
|---|---|---|---|
| 2008/0138700 A1 | 6/2008 | Horpel et al. | |
| 2010/0129699 A1* | 5/2010 | Mikhaylik | H01M 2/1653 429/50 |
| 2010/0173187 A1* | 7/2010 | Nishikawa | H01M 2/145 429/129 |
| 2010/0279173 A1* | 11/2010 | Hying | H01M 2/162 429/247 |
| 2012/0015228 A1* | 1/2012 | Yoon | H01M 2/162 429/144 |

FOREIGN PATENT DOCUMENTS

| | | |
|---|---|---|
| JP | 2011096831 A | 5/2011 |
| KR | 20070108086 A | 11/2007 |
| KR | 20110062665 A | 6/2011 |
| WO | 2007129842 A1 | 11/2007 |
| WO | 2010117195 A2 | 10/2010 |

OTHER PUBLICATIONS

Extended Search Report from European Application No. 13 75 7146, dated Sep. 28, 2015.

* cited by examiner

FIG. 1

- S10 — Step of charging inorganic particles to form charged inorganic particles
- S20 — Step of transferring inorganic particles on a substrate for a lithium secondary battery to form a coating layer
- S30 — Step of fixing coating layer with heat and pressure

METHOD OF COATING SUBSTRATE FOR LITHIUM SECONDARY BATTERY WITH INORGANIC PARTICLES AND LITHIUM SECONDARY BATTERY COMPRISING SUBSTRATE COATED BY THE METHOD

CROSS-REFERENCE TO RELATED APPLICATION

The present application is a continuation of International Application No. PCT/KR2013/001536 filed on Feb. 26, 2013, which claims priority to Korean Patent Application No. 10-2012-0022404 filed in the Republic of Korea on Mar. 5, 2012, and Korean Patent Application No. 10-2013-0019902 filed on Feb. 25, 2013, the disclosures thereof are incorporated herein by reference.

TECHNICAL FIELD

The present invention relates to a method of coating a substrate for a lithium secondary battery with inorganic particles and a lithium secondary battery comprising a substrate coated by the method, and more specifically a method of coating an electrode or separator for a lithium secondary battery with inorganic particles, which does not need a solvent and therefore has no burden on holding and storing the solvent, thereby having cost reducing effects and allowing for a highly effective and rapid coating, and a lithium secondary battery comprising a substrate coated by the method.

BACKGROUND ART

Recently, there has been growing interest in energy storage technologies. As energy storage technologies are extended to devices such as cellular phones, intensive research and development of electrochemical devices has been made, putting electrochemical devices as one of the subjects of great interest. Particularly, development of rechargeable secondary batteries has been the focus of attention. Recently, research and development of such batteries are focused on the designs of new electrodes and batteries to improve capacity density and specific energy.

Among currently available secondary batteries, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Meanwhile, conventional methods of preparing a cathode, an anode and a separator have been carried out by applying on each substrate an active material-slurry or an inorganic-slurry in which a solvent is contained, followed by drying, when forming an active material layer on the current collectors of the cathode and anode, or coating inorganics on the separator. Such a solvent is used for obtaining flexibility, proper dispersion of active materials and inorganic particles and appropriate viscosity.

However, according to conventional methods, purchase costs incurring depending on the use of solvents, additional costs that incur for handling and storing harmful solvents, as well as the reduction of a product yield that occurs due to a drying procedure after the coating of a slurry are all considered disadvantages.

DISCLOSURE

Technical Problem

The present invention is designed to solve the above-mentioned problems, and therefore it is an object of the present invention to provide a method of coating a substrate for a lithium secondary battery with inorganic particles, which does not need a solvent and therefore has no burden on holding and storing the solvent, thereby having cost reducing effects and allowing for a highly effective and rapid coating, and a lithium secondary battery comprising a substrate coated by the method.

Technical Solution

In order to accomplish the above object, in accordance with one aspect of the present invention, there is provided a method of coating a substrate for a lithium secondary battery with inorganic particles, comprising charging the inorganic particles to form charged inorganic particles; transferring the charged inorganic particles on the substrate for a lithium secondary battery to form a coating layer; and fixing the coating layer with heat and pressure.

The inorganic particles may further comprise a surface-modifying layer on the surface thereof.

In the present invention, the surface-modifying layer may be formed by modifying the surface of the inorganic particles with a surface-modifier selected from the group consisting of a substituted or unsubstituted silane-based compound, a substituted or unsubstituted siloxane-based compound, a substituted or unsubstituted silazane-based compound, a substituted or unsubstituted silanol-based compound, and a mixture thereof.

The surface-modifier may be any one selected from the group consisting of dimethyl dimethoxy silane, dimethyl diethoxy silane, methyl trimethoxy silane, vinyl trimethoxy silane, phenyl trimethoxy silane, tetraethoxy silane, dimethyl dichloro silane, 3-aminopropyl triethoxy silane, polydimethylsiloxane, polydiethylsiloxane, octamethyl cyclotetrasiloxane, hexamethyldisilazane, hexamethylcyclotrisilazane, heptamethyldisilazane, trimethylsilanol, triethylsilanol, triphenylsilanol, t-butyl dimethyl silanol, and a mixture thereof.

The inorganic particles may be metallic lithium, a carbon material, a metal compound or a mixture thereof, and in this case, the substrate for a lithium secondary battery may be a current collector for an anode.

Also, the metal compound may be a compound containing at least one selected from the group consisting of Si, Ge, Sn, Pb, P, Sb, Bi, Al, Ga, In, Ti, Mn, Fe, Co, Ni, Cu, Zn, Ag, Mg, Sr and Ba, and a mixture thereof.

In addition, the inorganic particles may be a lithium-containing oxide, and in this case, the substrate for a lithium secondary battery may be a current collector for a cathode.

The lithium-containing oxide may be a lithium-containing transition metal oxide, which may be selected from the group consisting of Li$_x$CoO$_2$ (0.5<x<1.3), Li$_x$NiO$_2$ (0.5<x<1.3), Li$_x$MnO$_2$ (0.5<x<1.3), Li$_x$Mn$_2$O$_4$ (0.5<x<1.3), Li$_x$(Ni$_a$Co$_b$Mn$_c$)O$_2$ (0.5<x<1.3, 0<a<1, 0<b<1, 0<c<1, a+b+c=1), Li$_x$Ni$_{1-y}$Co$_y$O$_2$ (0.5<x<1.3, 0<y<1), Li$_x$Co$_{1-y}$Mn$_y$O$_2$ (0.5<x<1.3, 0≤y<1), Li$_x$Ni$_{1-y}$Mn$_y$O$_2$ (0.5<x<1.3, 0≤y<1), Li$_x$(Ni$_a$Co$_b$Mn$_c$)O$_4$ (0.5<x<1.3, 0<a<2, 0<b<2, 0<c<2, a+b+c=2), Li$_x$Mn$_{2-z}$Ni$_z$O$_4$ (0.5<x<1.3, 0<z<2), Li$_x$Mn$_{2-z}$Co$_z$O$_4$ (0.5<x<1.3, 0<z<2), Li$_x$CoPO$_4$ (0.5<x<1.3), Li$_x$FePO$_4$ (0.5<x<1.3) and a mixture thereof.

Also, the inorganic particles may be any one selected from the group consisting of SrTiO$_3$, SnO$_2$, CeO$_2$, MgO, NiO, CaO, ZnO, ZrO$_2$, SiO$_2$, Y$_2$O$_3$, Al$_2$O$_3$, AlOOH, Al(OH)$_3$, TiO$_2$, SiC, BaTiO$_3$, Pb(Zr, Ti$_{1-x}$)O$_3$ (PZT, 0<x<1), Pb$_{1-x}$La$_x$Zr$_{1-y}$Ti$_y$O$_3$ (PLZT, 0<x<1, and 0<y<1), (1-x)Pb(Mg$_{1/3}$Nb$_{2/3}$)O$_3$-xPbTiO$_3$ (PMN-PT, 0<x<1), HfO$_2$, and a mixture thereof, and in this case, the substrate for a lithium secondary battery may be a porous substrate.

The porous substrate may be a polyolefin-based porous substrate, or a non-woven fabric made of any one selected from the group consisting of polyethylene terephthalates, polybutylene terephthalates, polyesters, polyacetals, polyamides, polycarbonates, polyimides, polyether ether ketones, polyether sulfones, polyphenylene oxides, polyphenylene sulfides, polyethylene naphthalenes and a mixture thereof.

Meanwhile, the inorganic particles may have an average diameter of 0.001 to 100 μm, and the coating layer may have a thickness of 1 to 250 μm.

Also, in accordance with another aspect of the present invention, there is provided a method of coating a substrate for a lithium secondary battery with inorganic particles, comprising mixing inorganic particles and a polymer binder to obtain a mixture; charging the mixture to form a charged mixture; transferring the charged inorganic particles on the substrate for a lithium secondary battery to form a coating layer; and fixing the coating layer with heat and pressure.

In the present invention, the polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxyl methyl cellulose, acrylonitrile-styrene-butadiene copolymer, polyimide, and a mixture thereof.

Further, in accordance with another aspect of the present invention, there is provided a substrate for a lithium secondary battery, comprising a coating layer prepared by the above-mentioned method.

In the present invention, the substrate may be an anode, a cathode or a separator.

Furthermore, in accordance with still another aspect of the present invention, there is provided a lithium secondary battery, comprising a cathode, an anode, a separator and a non-aqueous electrolyte solution, wherein at least one of the cathode, the anode and the separator is prepared by the above-mentioned method.

In the present invention, the non-aqueous electrolyte solution may comprise an organic solvent and an electrolyte salt. The organic solvent may be any one selected from the group consisting of ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA), methyl propionate (MP), and a mixture thereof.

Also, the electrolyte salt may comprise an anion selected from the group consisting of F$^-$, Cl$^-$, Br$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$ and (CF$_3$CF$_2$SO$_2$)$_2$N$^-$.

Advantageous Effects

In accordance with the present invention, a substrate for a lithium secondary battery can be coated by static electricity, without the addition of a solvent. Thus, non use of a solvent can result in cost-reducing effects since there is no burden on the handling and storing of the solvent, and since a drying procedure after slurry coating is not needed, it allows for the preparation of a lithium secondary battery in a highly effective and rapid manner.

DESCRIPTION OF DRAWINGS

Other objects and aspects of the present invention will become apparent from the following descriptions of the embodiments with reference to the accompanying drawings in which.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Also, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Figure 1:
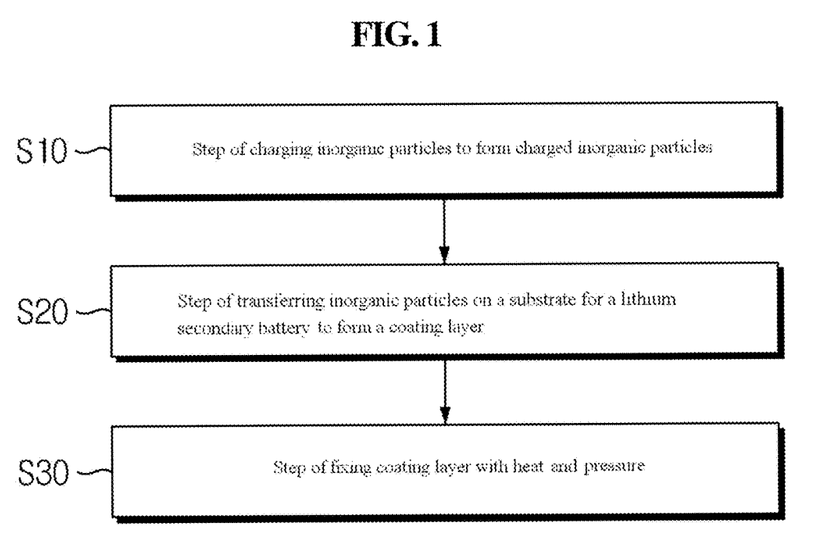
FIG. 1 is a flow chart showing the procedures of coating a substrate for a lithium secondary battery using inorganic particles in accordance with one embodiment of the present invention.

FIG. 1 is a flow chart showing the procedures of coating a substrate for a lithium secondary battery using inorganic particles in accordance with one embodiment of the present invention.

In the present invention, the substrate for a lithium secondary battery may be variously applied depending on uses of a substrate to be finally coated. For example, in the case the relevant use is for an anode, a cathode and a separator, the substrate for a lithium secondary battery may be an anode current collector, a cathode current collector and a porous substrate, respectively, and the inorganic particles may be anode active materials, cathode active materials, and inorganic particles used to form a porous coating layer of the separator, respectively.

First, in step S10 for carrying out a charging procedure, the inorganic particles are charged to form charged particles.

Specifically, the inorganic particles are placed in a bath and charged with a negative or positive electric charge. The charging procedure may be carried out by a corona discharge process using high voltage so as to apply electrostatic force to the inorganic particles, an arc discharge process, or a frictional electricity induction process using charge exchange which may be generated through a contact between different materials, but the present invention is not limited thereto. Such a charging is to actuate the inorganic particles so that the inorganic particles can be instantly or continuously adhered to a substrate.

The inorganic particles may further comprise a surface-modifying layer on the surface thereof, so as to increase their adhesiveness to the substrate for a lithium secondary battery.

The surface modifying of the inorganic particles may be carried out, prior to the charging step, with a surface-modifier selected from the group consisting of a substituted or unsubstituted silane-based compound, a substituted or unsubstituted siloxane-based compound, a substituted or unsubstituted silazane-based compound, a substituted or unsubstituted silanol-based compound, and a mixture thereof.

In the present invention, the silane-based compound may be an organic silane having a structure of $Si(OR^1)_{4-n}R^2_n$ (wherein $R^1$ and $R^2$ are each independently a substituent selected from hydrogen, alkyl, vinyl, amine and aryl, and n is an integer of 4 or less).

Specific examples of the silane-based compound may include dimethyl dimethoxy silane, dimethyl diethoxy silane, methyl trimethoxy silane, vinyl trimethoxy silane, phenyl trimethoxy silane, tetraethoxy silane, dimethyl dichloro silane, and 3-aminopropyl triethoxy silane.

The substituted or unsubstituted siloxane-based compound may be a compound having a structure of $R^1R^2SiO$ (wherein $R^1$ and $R^2$ are each independently a substituent selected from hydrogen, alkyl, vinyl, amine and aryl).

Specific examples of the siloxane-based compound may include polydimethylsiloxane, polydiethylsiloxane and octamethyl cyclotetrasiloxane.

The substituted or unsubstituted silazane-based compound may be a compound having a structure of $Si_2NR^1R^2R^3R^4R^5R^6R^7$ (wherein $R^1$ to $R^7$ are each independently a substituent selected from hydrogen, alkyl, vinyl, amine and aryl), and specific examples thereof may include hexamethyldisilazane, hexamethylcyclotrisilazane and heptamethyldisilazane.

The substituted or unsubstituted silaol-based compound may be a compound having a structure of $SiOHR^1R^2R^3$ (wherein $R^1$ to $R^3$ are each independently a substituent selected from hydrogen, alkyl, vinyl, amine and aryl), and specific examples thereof may include trimethylsilanol, triethylsilanol, triphenylsilanol and t-butyl dimethyl silanol.

Also, the surface-modifying layer may be formed by changing a functional group on a surface or controlling the hydrophilic or hydrophobic of a surface, through adsorption using a polymer such as polyethylene glycol (PEG) or using electrostatic affinity of a cationic surfactant such as cetyl trimethyl ammonium bromide (CTAB), or chemical bonding using a coupling agent, which is reactive to a silanol group, such as 3-aminopropyl triethoxy silane.

In addition, the inorganic particles may have an average diameter of 0.001 to 100 μm, preferably 0.01 to 50 μm. When the average diameter of the inorganic particles satisfies such a range, the specific surface area of the inorganic particles largely increases to prevent a binder for binding them from being used in an excess amount, and eventually obtains a coating layer of the inorganic particles which has an appropriate coating thickness, and an appropriate pore size and porosity among the inorganic particles.

For example, in the case of preparing an anode, the inorganic particles may be metallic lithium, a carbon material, a metal compound or a mixture thereof, to which a binder may be further added so as to increase binding strength among anode active materials or between the anode active materials and an anode current collector.

The carbon material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes.

The metal compound may be a compound containing at least one selected from the group consisting of Si, Ge, Sn, Pb, P, Sb, Bi, Al, Ga, In, Ti, Mn, Fe, Co, Ni, Cu, Zn, Ag, Mg, Sr and Ba, or a mixture thereof. Such a metal compound may be various forms including complexes, alloys, oxides such as $TiO_2$ and $SnO_2$, nitrides, sulfides, borides, alloys with lithium. Among these, complexes, alloys, oxides, and alloys with lithium may be induce the high capacity of batteries. In particular, when at least one element selected from Si, Ge and Sn, more preferably Si and Sn may be present, the high capacity of batteries may be more enhanced.

In the present invention, the binder functions to connect the inorganic particles to each other physically or electrically, and conventional binders may be used without any limitation.

For example, the binder may be various polymers for a binder, including Nafion resin, a fluoro-containing resin, polytetrafluoroethylene (PTFE), polyvinylidene fluoride-co-hexafluoro propylene (PVDF-co-HFP), polyvinylidene fluoride, polyacrylonitrile, polymethyl methacrylate, styrene-butadiene rubber (SBR), and carboxy methyl cellulose (CMC).

Also, in the case of preparing a cathode, the inorganic particles may be a cathode active material such as a lithium-containing oxide, which may further comprise a conductive material or a binder. The lithium-containing oxide may be a lithium-containing transition metal oxide, which may be selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xN_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3) and a mixture thereof, but is not limited thereto. The lithium-containing transition metal oxide may be coated with a metal such as aluminum (Al) or a metal oxide. Besides the lithium-containing transition metal oxide, sulfides, selenides and halogenides may also be used.

The conductive material is not particularly limited if it is any electron-conductive material which does not cause a chemical change in an electrochemical device. Generally, carbon black, graphite, carbon fiber, carbon nanotube, metal powders, a conductive metal oxide and an organic conductive material may be used. Examples of a commercially available conductive material include acetylene black-based products (Chevron Chemical Company or Gulf Oil Company), Ketjen Black EC-based products (Armak Company, Vulcan XC-72 (Cabot Company) and Super P (MMM Carbon Company). For example, acetylene black, carbon black and graphite may be used.

In addition, in the case of preparing a separator, the inorganic particles may be any one selected from the group consisting of $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, and $0<y<1$), $(1-x)Pb(Mg_{1/3}Nb_{2/3})O_{3-x}Pb$-$TiO_3$ (PMN-PT, $0<x<1$), $HfO_2$, and a mixture thereof.

Then, in step S20 for carrying out a transferring procedure, the charged inorganic particles are transferred on the substrate for a lithium secondary battery to form a coating layer.

The coating layer may have a thickness of 1 to 250 μm. For example, in the case of the coating layer formed on a cathode, the thickness thereof may be 10 to 250 μm, preferably 30 to 180 μm, in the case of the coating layer formed on an anode, the thickness thereof may be 10 to 250 μm, preferably 30 to 180 μm, and the case of the coating layer formed on a separator, the thickness thereof may be 1 to 40 μm, preferably 2 to 15 μm.

When the coating layer formed on a cathode or an anode satisfies such a thickness range, active materials in each electrode may be present in a sufficient amount, the capacity of batteries may be prevented from being reduced, and cycle and rate characteristics may be improved. Also, when the coating layer formed on a separator satisfies such a thickness range, an additional path for transferring lithium ions may increase and the impregnation of an electrolyte solution may be improved, thereby enhancing the performances and thermal stability of batteries.

If the charged inorganic particles are charged with a positive or negative charge, the substrate for a lithium secondary battery may be oppositely charged with a negative or positive charge. Accordingly, when the substrate for a lithium secondary battery is positioned around the charged inorganic particles, the charged inorganic particles are adhered to the substrate for a lithium secondary battery by the action of electrostatic force, to form a coating layer.

In the present invention, the substrate for a lithium secondary battery may include an anode current collector, a cathode current collector and a porous substrate, depending on uses thereof, and the transferred inorganic particles may be different depending on the kind of each substrate, as mentioned above.

The anode current collector and the cathode current collector which are used in the present invention are not limited if they are made of a high conductive metal which does not cause a reaction in the voltage range of a lithium secondary battery. Non-limiting examples of the anode current collector include a foil made of copper, gold, nickel, a copper-containing alloy, or a combination thereof, and non-limiting examples of the cathode current collector include a foil made of aluminum, nickel or a combination thereof. Also, the anode current collector and the cathode current collector may be used by laminating substrates made of such a material.

The porous substrate which are used in the present invention is not limited if it is a polyolefin-based porous substrate which is conventionally used in the art. The examples thereof may include a polyolefin-based porous substrate, and a non-woven fabric made of any one selected from the group consisting of polyethylene terephthalates, polybutylene terephthalates, polyesters, polyacetals, polyamides, polycarbonates, polyimides, polyether ether ketones, polyether sulfones, polyphenylene oxides, polyphenylene sulfides, polyethylene naphthalenes and a mixture thereof.

The polyolefin-based porous substrate may be any one which is conventionally used. More specifically, a membrane or non-woven fabric made of a polyolefin-based polymer selected from polyethylene such as high-density polyethylene, linear low-density polyethylene, low-density polyethylene and ultra-high molecular weight polyethylene, polypropylene, polybutylene, polypentene and a mixture thereof may be used.

Subsequently, in step S30 for carrying out a fixing procedure, the coating layer formed on the substrate for a lithium secondary battery is fixed with heat and pressure.

Specifically, the coating layer may be heated or pressed by passing through a heating and pressing roller. If heating and pressing are carried out at a temperature of 60 to 180° C. and a pressure of 1 to 300 $kgf/cm^2$, more uniform coating may be obtained.

Meanwhile, in accordance with another embodiment of the present invention, there is provided a method of coating a substrate for a lithium secondary battery with inorganic particles, comprising mixing inorganic particles and a polymer binder to obtain a mixture; charging the mixture to form a charged mixture; transferring the charged inorganic particles on the substrate for a lithium secondary battery to form a coating layer; and fixing the coating layer with heat and pressure.

The mixture comprises the inorganic particles together with a polymer binder to have increased adhesiveness.

The polymer binder may be any one selected from the group consisting of polyvinylidene fluoride (PVDF), hexafluoro propylene (HFP), polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxyl methyl cellulose, acrylonitrile-styrene-butadiene copolymer, polyimide, and a mixture thereof.

Further, in accordance with another aspect of the present invention, there is provided a substrate for a lithium secondary battery, comprising a coating layer prepared by the above-mentioned method. In the present invention, the substrate may be an anode, a cathode or a separator.

Furthermore, in accordance with still another aspect of the present invention, there is provided a lithium secondary battery, comprising a cathode, an anode, a separator and a non-aqueous electrolyte solution, wherein at least one of the cathode, the anode and the separator is prepared by the above-mentioned method according to one embodiment of the present invention.

The lithium secondary battery according to one embodiment of the present invention may be prepared according to conventional methods which are well known in the art. For example, a separator obtained by the coating method according to one embodiment of the present invention is interposed between a cathode and anode obtained by the coating method according to one embodiment of the present invention, and then a non-aqueous electrolyte solution is introduced therein, to prepare the lithium secondary battery.

The non-aqueous electrolyte solution may comprise an organic solvent and an electrolyte salt. The organic solvent may be any one which is conventionally used in an electrolyte solution for a lithium secondary battery, and examples thereof may include ethylene carbonate (EC), propylene carbonate (PC), butylenes carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methyl acetate (MA), methyl propionate (MP), and a mixture thereof, but the present invention is not limited thereto. In particular, among the above carbonate-based organic solvents, the cyclic carbonates such as ethylene carbonate and propylene carbonate are preferred since they have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the electrolyte salt of the non-aqueous electrolyte solution may comprise an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$. Non-limiting examples of the electrolyte salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and mixtures thereof, but the present invention is not limited thereto.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

EXAMPLES

Example 1

Figure 2:
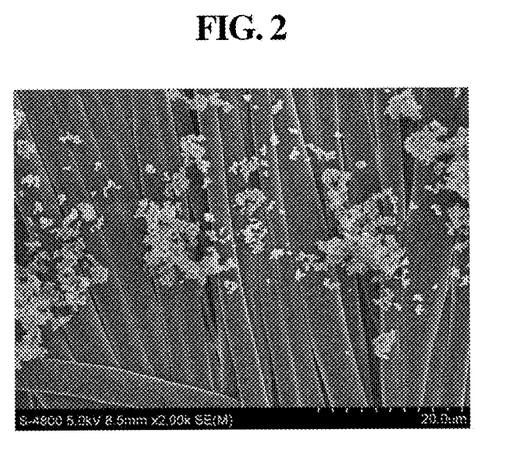
FIG. 2 is a SEM photograph of a separator coated with inorganic particles, prepared according to one embodiment of the present invention.

Boehmite (Actilox 200SM, Nabaltec) having an average diameter of 0.2 μm was used as inorganic particles and was inserted in the cartridge of a laser printer (HP2605dn). Then, the boehmite was transferred on a substrate made of a non-woven fabric (LP1540, Mistubishi Paper Mills), and fixed at 200° C., to prepare a separator. The separator thus prepared was observed with SEM for its form, and the result thereof is shown in FIG. 2.

Example 2

Figure 3:
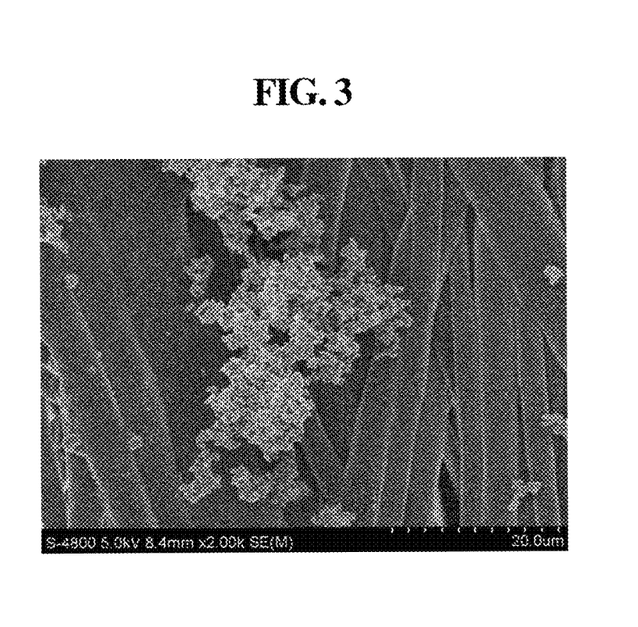
FIG. 3 is a SEM photograph of a separator coated with surface-modified inorganic particles, prepared according to one embodiment of the present invention.

Boehmite (Apyral AOH60, Nabaltec) having an average diameter of 0.9 μm was used as inorganic particles and surface-modified with 3-aminopropyl triethoxysilane (APTES), and the surface-modified boehmite was inserted in the cartridge of a laser printer (HP2605dn). Then, the surface-modified boehmite was transferred on a substrate made of a non-woven fabric (LP1540, Mistubishi Paper Mills), and fixed at 200° C., to prepare a separator. The separator thus prepared was observed with SEM for its form, and the result thereof is shown in FIG. 3.

Example 3

Figure 4:
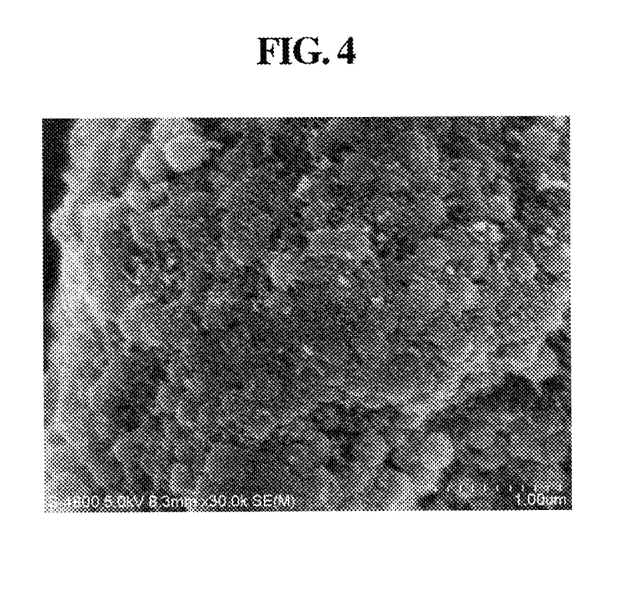
FIG. 4 is a SEM photograph of a mixture containing inorganic particles, prepared according to one embodiment of the present invention.

100 Parts by weight of polyvinylidene fluoride-co-hexafluoro propylene particles (Kynar 2751, Arkema) having an average diameter of 0.2 μm was used as a binder, to which 5 parts by weight of silica nanoparticles (Aerosil R805, Degusa) having a diameter of 0.7 μm was added, followed by mixing for 5 minutes at 5,000 rpm, to obtain a mixture. The inorganic particles-containing mixture thus obtained was observed with SEM for its form, and the result thereof is shown in FIG. 4.

Figure 5:
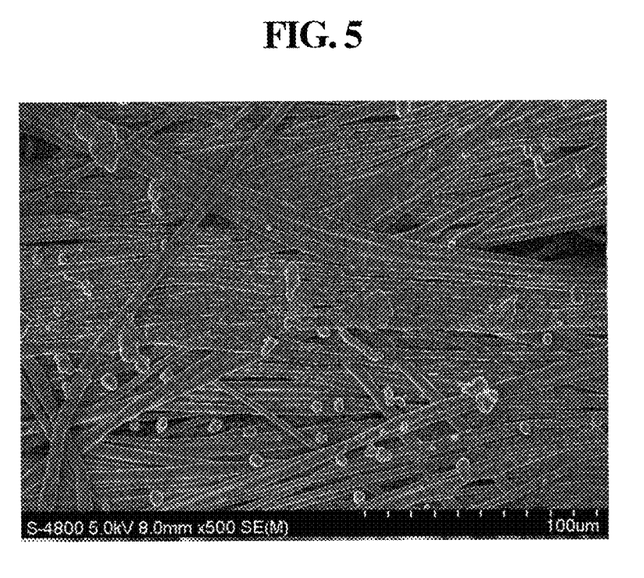
FIG. 5 is a SEM photograph of a separator coated with a mixture containing inorganic particles, prepared according to one embodiment of the present invention.

Subsequently, the inorganic particles-containing mixture was inserted in the cartridge of a laser printer (HP2605dn). Then, the inorganic particles-containing mixture was transferred on a substrate made of a non-woven fabric (LP1540, Mistubishi Paper Mills), and fixed at 200° C., to prepare a separator. The separator thus prepared was observed with SEM for its form, and the result thereof is shown in FIG. 5.

The present invention has been described in detail. However, it should be understood that the detailed description and specific examples, while indicating preferred embodiments of the present invention, are given by way of illustration only, since various changes and modifications within the spirit and scope of the disclosure will become apparent to those skilled in the art from this detailed description. Also, it should be understood that the Examples of the present invention are provided for the purpose of illustrations only and to better explain to a person having ordinary skill in the art, and is not intended to limit the scope of the present invention, so other equivalents and modifications could be made thereto without departing from the spirit and scope of the present invention.

What is claimed is:

1. A method of coating a substrate for a lithium secondary battery with inorganic particles, comprising:
   modifying the surface of the inorganic particles by using only a surface-modifier selected from the group consisting of a substituted or unsubstituted saline-based compound, a substituted or unsubstituted siloxane-based compound, a substituted or unsubstituted silazane-based compound, a substituted or unsubstituted silanol-based compound, and a mixture thereof;
   charging the inorganic particles having the surface-modifying layer formed on the surface thereof to form charged inorganic particles;
   transferring the charged inorganic particles on the substrate for the lithium secondary battery to form a coating layer; and
   fixing the coating layer with heat and pressure
   wherein the charging of the inorganic particles to form charged inorganic particles actuates the inorganic particles so that the inorganic particles can be instantly or continuously adhered to the substrate without the use of a solvent.

2. The method of coating the substrate for the lithium secondary battery according to claim 1, wherein the silane-based compound is a compound having a structure of $Si(OR^1)_{4-n}R^2_n$, wherein $R^1$ and $R^2$ are each independently a substituent selected from hydrogen, alkyl, vinyl, amine and aryl, and n is an integer of 4 or less;

the siloxane-based compound is a compound having a structure of $R^1R^2SiO$ wherein $R^1$ and $R^2$ are each independently a substituent selected from hydrogen, alkyl, vinyl, amine and aryl;

the silazane-based compound is a compound having a structure of $Si_2NR^1R^2R^3R^4R^5R^6R^7$ wherein $R^1$ to $R^7$ are each independently a substituent selected from hydrogen, alkyl, vinyl, amine and aryl;

the silanol-based compound is a compound having a structure of $SiOHR^1R^2R^3$ wherein $R^1$ to $R^3$ are each independently a substituent selected from hydrogen, alkyl, vinyl, amine and aryl.

3. The method of coating the substrate for the lithium secondary battery according to claim 1, wherein the surface-modifier is any one selected from the group consisting of dimethyl dimethoxy silane, dimethyl diethoxy silane, methyl trimethoxy silane, vinyl trimethoxy silane, phenyl trimethoxy silane, tetraethoxy silane, dimethyl dichloro silane, 3-aminopropyl triethoxy silane, polydimethylsiloxane, polydiethylsiloxane, octamethyl cyclotetrasiloxane, hexamethyldisilazane, hexamethylcyclotrisilazane, heptamethyldisilazane, trimethylsilanol, triethylsilanol, triphenylsilanol, t-butyl dimethyl silanol, and a mixture thereof.

4. The method of coating the substrate for the lithium secondary battery according to claim 1, wherein the inorganic particles are metallic lithium, a carbon material, a metal compound or a mixture thereof, and the substrate for a lithium secondary battery is a current collector for an anode.

5. The method of coating the substrate for the lithium secondary battery according to claim 4, wherein the metal compound is a compound containing at least one selected from the group consisting of Si, Ge, Sn, Pb, P, Sb, Bi, Al, Ga, In, Ti, Mn, Fe, Co, Ni, Cu, Zn, Ag, Mg, Sr and Ba, and a mixture thereof.

6. The method of coating the substrate for the lithium secondary battery according to claim 1, wherein the inorganic particles are a lithium-containing oxide, and the substrate for a lithium secondary battery is a current collector for a cathode.

7. The method of coating the substrate for the lithium secondary battery according to claim 6, wherein the lithium-containing oxide is a lithium-containing transition metal oxide.

8. The method of coating the substrate for the lithium secondary battery according to claim 7, wherein the lithium-containing transition metal oxide is selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_b\text{-}Mn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $O\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), $Li_xFePO_4$ ($0.5<x<1.3$) and a mixture thereof.

9. The method of coating the substrate for the lithium secondary battery according to claim 1, wherein the inorganic particles are any one selected from the group consisting of $SrTiO_3$, $SnO_2$, $CeO_2$, $MgO$, $NiO$, $CaO$, $ZnO$, $ZrO_2$, $SiO_2$, $Y_2O_3$, $Al_2O_3$, $AlOOH$, $Al(OH)_3$, $TiO_2$, $SiC$, $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, and $0<y<1$), $(1-x)Pb(Mg_{1/3}Nb_{2/3})O_3\text{-}xPbTiO_3$ (PMN-PT, $0<x<1$), $HfO_2$, and a mixture thereof, and the substrate for a lithium secondary battery is a porous substrate.

10. The method of coating the substrate for the lithium secondary battery according to claim 9, wherein the porous substrate is a polyolefin-based porous substrate, or a nonwoven fabric made of any one selected from the group consisting of polyethylene terephthalates, polybutylene terephthalates, polyesters, polyacetals, polyamides, polycarbonates, polyimides, polyether ether ketones, polyether sulfones, polyphenylene oxides, polyphenylene sulfides, polyethylene naphthalenes and a mixture thereof.

11. The method of coating the substrate for the lithium secondary battery according to claim 1, wherein the inorganic particles have an average diameter of 0.001 to 100 μm.

12. The method of coating the substrate for the lithium secondary battery according to claim 1, wherein the coating layer has a thickness of 1 to 250 μm.

13. A method of coating a substrate for a lithium secondary battery with inorganic particles, comprising:

modifying the surface of inorganic particles by using only a surface-modifier selected from the group consisting of a substituted or unsubstituted silane-based compound, a substituted or unsubstituted siloxane-based compound, a substituted or unsubstituted silazane-based compound, a substituted or unsubstituted silanol-based compound, and a mixture thereof;

mixing inorganic particles having the surface-modifying layer formed on the surface thereof and a polymer binder to obtain a mixture;

charging the mixture to form a charged mixture;

transferring the charged inorganic particles on the substrate for a lithium secondary battery to form a coating layer; and fixing the coating layer with heat and pressure wherein the charging of the mixture to form a charged mixture actuates the inorganic particles so that the inorganic particles can be instantly or continuously adhered to the substrate without the use of a solvent.

14. The method of coating the substrate for the lithium secondary battery according to claim 13, wherein the polymer binder is any one selected from the group consisting of polyvinylidene fluoride (PVDF), hexafluoro propylene (HFP), polyvinylidene fluoride-co-hexafluoro propylene, polyvinylidene fluoride-co-trichloro ethylene, polymethyl methacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxyl methyl cellulose, acrylonitrile-styrene-butadiene copolymer, polyimide, and a mixture thereof.

15. A method of coating a substrate for a lithium secondary battery with inorganic particles, comprising:

modifying the surface of inorganic particles by using a surface-modifier selected from the group consisting of a substituted or unsubstituted silane-based compound, a substituted or unsubstituted siloxane-based compound, a substituted or unsubstituted silazane-based compound, a substituted or unsubstituted silanol-based compound, and a mixture thereof, wherein the surface modifying agent modifies the surface of the inorganic particle by (a) changing a functional group on a surface or controlling the hydrophilic or hydrophobic of a surface, or (b) through adsorption using a polymer, or (c) using electrostatic affinity of a cationic surfactant, or
(d) chemical bonding using a coupling agent;
charging the inorganic particles having the surface-modifying layer formed on the surface thereof to form charged inorganic particles;
transferring the charged inorganic particles on the substrate for the lithium secondary battery to form a coating layer; and
fixing the coating layer with heat and pressure
wherein the charging of the inorganic particles to form charged inorganic particles actuates the inorganic particles so that the inorganic particles can be instantly or continuously adhered to the substrate without the use of a solvent.

* * * * *